US 10,600,093 B2

(12) United States Patent
Wilson

(10) Patent No.: US 10,600,093 B2
(45) Date of Patent: Mar. 24, 2020

(54) SHORT-PAID RECONCILIATION SYSTEMS AND METHODS

(71) Applicant: Neopost Technologies, Bagneux (FR)

(72) Inventor: Kirk Lane Wilson, Woodbridge, CT (US)

(73) Assignee: Neopost Technologies, Bagneux (FR)

( * ) Notice: Subject to any disclaimer, the term of this patent is extended or adjusted under 35 U.S.C. 154(b) by 0 days.

(21) Appl. No.: 15/881,099

(22) Filed: Jan. 26, 2018

(65) Prior Publication Data

US 2018/0165726 A1     Jun. 14, 2018

Related U.S. Application Data

(63) Continuation of application No. 15/282,268, filed on Sep. 30, 2016, now abandoned.

(51) Int. Cl.
*G06Q 30/02* (2012.01)

(52) U.S. Cl.
CPC ..... *G06Q 30/0283* (2013.01); *G06Q 2250/10* (2013.01)

(58) Field of Classification Search
CPC .................................. G06Q 30/0283
See application file for complete search history.

(56) References Cited

U.S. PATENT DOCUMENTS

| | | | |
|---|---|---|---|
| 5,019,991 A | 5/1991 | Sansone et al. | |
| 5,452,654 A | 9/1995 | Connell et al. | |
| 5,819,239 A | 10/1998 | Berson et al. | |
| 5,844,220 A | 12/1998 | Eddy et al. | |
| 6,032,122 A | 2/2000 | Gertner et al. | |
| 6,058,384 A | 5/2000 | Pierce et al. | |
| 6,119,051 A | 9/2000 | Anderson, Jr. et al. | |
| 6,941,286 B1 | 9/2005 | Foth | |
| 7,451,119 B2 | 11/2008 | Elliot et al. | |
| 7,539,622 B1 | 5/2009 | Harris et al. | |

(Continued)

FOREIGN PATENT DOCUMENTS

| | | |
|---|---|---|
| EP | 0373972 A3 | 1/1991 |
| EP | 2579222 A1 | 4/2013 |
| EP | 2362196 A3 | 8/2014 |

OTHER PUBLICATIONS

Wikipedia, "Distributed computing," www.wikipedia.org, version of article dated Aug. 28, 2015, article retrieved on Apr. 12, 2018.*

(Continued)

*Primary Examiner* — Nathan Erb
(74) *Attorney, Agent, or Firm* — Morris & Kamlay LLP

(57) ABSTRACT

Systems and methods are provided for enabling third parties, such as authorized vendors, to reconcile short-paid adjustment requests initiated by service providers such as, for example, the United States Postal Service, in response to customer non- or underpayment for services rendered. In an embodiment, a method includes the steps of storing a short-paid adjustment request from an initiator, identifying a source for the short-paid adjustment request, generating a request to a VBI meter system for a short-paid adjustment request based on the source identified, storing the VBI meter system response to the short-paid adjustment request, and generating a file to the initiator based on the VBI meter system response.

22 Claims, 6 Drawing Sheets

(56) References Cited

U.S. PATENT DOCUMENTS

| | | |
|---|---|---|
| 8,036,994 B2 | 10/2011 | Elliot et al. |
| 8,332,230 B2 | 12/2012 | Ryan, Jr. |
| 8,781,927 B2 | 7/2014 | Killian et al. |
| 9,208,620 B1 * | 12/2015 | Bortnak ............ G07B 17/0008 |
| 2002/0023057 A1 | 2/2002 | Goodwin et al. |
| 2003/0160097 A1 * | 8/2003 | Steiner ................ G06Q 30/02 |
| | | 235/385 |
| 2003/0182154 A1 | 9/2003 | Myers et al. |
| 2003/0182155 A1 | 9/2003 | Nitzan et al. |
| 2004/0093312 A1 | 5/2004 | cordery et al. |
| 2005/0006286 A1 | 1/2005 | Fery et al. |
| 2005/0015344 A1 | 1/2005 | Athens et al. |
| 2005/0167342 A1 | 8/2005 | Vullriede et al. |
| 2005/0182735 A1 | 8/2005 | Zager et al. |
| 2006/0041505 A1 | 2/2006 | Enyart |
| 2008/0027839 A1 * | 1/2008 | O'Regan ............ H04M 15/7655 |
| | | 705/34 |
| 2008/0283586 A1 * | 11/2008 | Marks .................. G06Q 10/08 |
| | | 235/375 |
| 2014/0006301 A1 | 1/2014 | Gullo |
| 2014/0067664 A1 * | 3/2014 | Bussell ............ G07B 17/00435 |
| | | 705/39 |
| 2014/0229369 A1 * | 8/2014 | Tsuie ............... G07B 17/00362 |
| | | 705/39 |
| 2014/0324702 A1 * | 10/2014 | Whitehouse ..... G07B 17/00024 |
| | | 705/44 |

OTHER PUBLICATIONS

Nottingham Evening Post, "Make sure you pay the correct postage rates: Opinion& your pictures," 12, Nottingham (UK), MGN Ltd., Dec. 4, 2012.*

International Search Report and Written Opinion dated Dec. 28, 2017 as received in Application No. PCT/US2017/054780.

United States Postal Service, "Automated Package Verification (APV) Dispute Files Draft", Working Draft Version 1.1 (Jul. 5, 2016).

United States Postal Service, "Automated Package Verification (APV) Standard Operating Procedure", Version 1.34 (Feb. 16, 2016).

* cited by examiner

SHORT-PAID RECONCILIATION SYSTEMS AND METHODS

BACKGROUND OF THE INVENTION

Background

Historically, a postal consumer mailed letters and shipped parcels through the use physical stamps purchased from a local post office.

The advent of the mechanical postage machine was a technological advance that enhanced the postal consumer experience by providing a mechanical postage meter that produced a machine-generated stamp, or "indicia", as an alternative to using a physical stamp for mailing a letter and shipping a parcel. The postage machine enabled consumers to purchase or pre-pay for bulk amounts of postage and to use their postage meter (typically in an office setting) to manually or mechanically apply the requisite postage to the mail and parcel to be posted. It also enabled the customer to better plan for and to minimize trips to the post office.

The mechanical postage meter was the core of the mechanical postage machine, and included an ascending register to record the total value of all postage printed during the life of the meter, a descending register to record the value of the postage remaining in the meter at any particular point in time, and a metal die that printed the indicia (or postage amounts) on the item to be posted. The descending register, in turn, and from the post office perspective, was the heart of the postage meter, and federal regulations mandated that once funds were added to the meter, the only other way to alter the value contained in or on a descending register was by the creation of indicia. That mandate still exists on postage meters today.

The mechanical postage machine, while a technological advance, was not without its drawbacks as it required a customer to place the meter in a post office issued carrier and return to the post office every time the funds stored on the meter were exhausted, so that the credit available on the meter could be replenished and the meter could be "reset." It was often prone to mechanical failure. Moreover, and at a minimum, it would call for replenishment of the red ink used to stamp the indicia, at times that did not necessarily coincide with the need to the replenish funds on the meter.

These drawbacks to the mechanical postage machine, coupled with advancements in technology in general, including the evolution of the internet and e-commerce, prompted the advent of the electronic postage meter and the modern day postal delivery system (PDS).

A PDS is a system for delivering mail pieces, parcels and packages. A PDS may be publicly or governmentally sponsored service provider, such as by the USPS, or may be privately sponsored, such as by service providers including Federal Express®, DHL®, and UPS®. A PDS may also involve a partnership with an authorized vendor such as Neopost.

A PDS may include a postal evidencing system (PES). A PES is a product or system that includes an electronic postal meter, such as a Postal Security Device (PSD). A PSD includes an ascending register and a descending register that each function in the same way as in a mechanical postage meter. However, the PSD does not include a metal die for printing indicia. Instead, the PSD produces a secure data record representing meter-generated evidence of prepaid postage that may be communicated to a printing device and printed directly or indirectly on to mail items. Such meter-generated evidence may include an electronic stamp, also known as an IBI (Information-Based Indicia) or an IMI (Intelligent Mail Indicia). In a PDS environment, a meter (or PSD) reset may occur by connecting to a meter resetting system, such as a computerized meter resetting system (CMRS), which is operated by an authorized vendor.

A PSD may be physical or virtual, and may exist in a "closed" or an "open" PES environment. A "closed" PES environment, as exemplified by the mechanical postage machines described above, and franking machines first launched in the late 1800s, typically includes a physical postal meter. In a closed PES environment, a service provider or authorized vendor may lease the postal meter to a customer. A customer is required to have funds available on deposit with the provider or the vendor before resetting a PES, or the vendor may opt to provide a funds advance in accordance with appropriate regulations.

An "open" PES environment typically includes a virtual meter that is managed by an authorized vendor. In an open PES environment, the meter is accessible by many customers; the authorized vendor pays the service provider for the postage purchased by the customer and the customer pays the authorized vendor.

"PC Postage" is an example of an open PES environment and was launched by the USPS in 1999. PC Postage is a system that provides customers with an online alternative to standing in line or using a postage meter to purchase postage for their outgoing mail. In conjunction with the launch of this program, the USPS certified and authorized vendors to offer PC Postage services to consumers.

To use PC Postage, a consumer may install an authorized vendor's software application on their local computer, set up a payment account with the authorized vendor, and use the authorized vendor portal to access through the internet to a PSD to obtain an indicia.

As used herein, the term "mail" generally refers to mail pieces, parcels and packages that are shipped by service providers including the USPS and other national or international postal services, as well as foreign and domestic commercial shipping service providers including, for example, Federal Express®, DHL®, and UPS®.

BRIEF SUMMARY

The present invention provides advantageous systems and methods for reconciling short-paid deficiencies in payments by customers to service providers for services rendered.

According to an embodiment of the disclosed subject matter, a method is provided to reconcile a short-paid adjustment request received from an initiator that includes the steps of storing at least one short-paid adjustment request from the initiator, identifying at least one source for the short-paid adjustment request, generating a request to a value bearing item (VBI) meter system for a short-paid meter adjustment based on the at least one identified source, storing the VBI meter system response to the short-paid meter adjustment request, and generating at least one file to the initiator based on the VBI meter system response to the short-paid meter adjustment request.

According to an embodiment of the disclosed subject matter, a method is provided to reconcile a short-paid adjustment request received from an initiator that includes the steps of generating a request to a VBI meter system for a short-paid meter adjustment based on a prior short-paid meter adjustment request, storing the VBI meter system response to the short-paid meter adjustment request, determining the status of the short-paid adjustment request, and generating at least one file to the initiator based on the response to the short-paid meter adjustment request.

According to an embodiment of the disclosed subject matter, a system is provided where a non-transitory computer-readable medium uses processor-executable instructions stored therein and configured to cause a processor to initiate storing at least one short-paid adjustment request from an initiator, identifying at least one source for the short-paid adjustment request, generating a request to a VBI meter system for a short-paid meter adjustment based on the at least one identified source, storing the VBI meter system response to the short-paid meter adjustment request; and generating at least one file to the initiator based on the VBI meter system response to the short-paid meter adjustment request.

According to an embodiment of the disclosed subject matter, a system is provided where a non-transitory computer-readable medium uses processor-executable instructions stored therein and configured to cause a processor to initiate generating a request for a short-paid meter adjustment based on a prior short-paid meter adjustment request, storing a response to the short-paid meter adjustment request, determining the status of the short-paid adjustment request, and generating at least one file to an initiator based on the response to the short-paid meter adjustment request.

According to an embodiment of the disclosed subject matter, a system is provided for reconciling at least one short-paid adjustment request received from an initiator that includes a VBI meter system for generating evidence of a short-paid adjustment and a processor coupled to the VBI meter system. In the system of this embodiment, the processor is configured to process and identify one or more sources of the short-paid adjustment request, invoke a short-paid meter adjustment request for a value adjustment to the VBI meter system based on at least one short-paid adjustment request, and generate at least one file for the initiator based on the VBI meter system response to the short-paid meter adjustment request.

According to an embodiment of the disclosed subject matter, a system is provided for reconciling at least one short-paid adjustment request received from an initiator that includes a network, a VBI meter system coupled to the network for generating evidence of a short-paid adjustment, and a processor coupled to the network. In the system of this embodiment, the processor is configured to process and identify one or more sources of the short-paid adjustment request, invoke a short-paid meter adjustment request for a value adjustment to the VBI meter system based on at least one short-paid adjustment request, and generate at least one file for the initiator based on the VBI meter system response to the short-paid meter adjustment request.

According to an embodiment of the disclosed subject matter, a method is provided for reconciling at least one short-paid adjustment request received from an initiator that includes storing at least one short-paid adjustment request from the initiator, identifying at least one source for the short-paid adjustment request, generating a request to a VBI meter system for a short-paid meter adjustment based on one or both of the at least one source or a prior short-paid meter adjustment request, storing the VBI meter system response to the short-paid meter adjustment, determining the status of the short-paid adjustment request, and generating at least one file for the initiator based on the VBI meter system response to the short-paid meter adjustment request.

According to an embodiment of the disclosed subject matter, a system is provided where a non-transitory computer-readable medium uses processor-executable instructions stored therein and configured to cause a processor to initiate storing at least one short-paid adjustment request from an initiator, identifying at least one source for each short-paid adjustment request, generating a request for short-paid meter adjustment based on one or both of the at least one source or a prior short-paid meter adjustment request, storing the response to the short-paid meter adjustment request, determining the status of the short-paid adjustment request, and generating at least one file to the initiator based on the response to the short-paid meter adjustment request.

According to an embodiment of the disclosed subject matter, a method is provided to reconcile a short-paid adjustment request received from an initiator that includes the steps of receiving a request for a short-paid adjustment, evaluating an available postage value present on the VBI meter system, updating register values on the VBI meter system, storing, as the short-paid adjustment, a record including at least the updated register values and a short-paid adjustment record indicator value, and outputting at least one of a result status and evidence of the short-paid adjustment.

According to an embodiment of the disclosed subject matter, a system is provided where a non-transitory computer-readable medium uses processor-executable instructions stored therein and configured to cause a processor to initiate handling a request for evidence of a short-paid meter adjustment, identifying at least one data record representing the short-paid meter adjustment, and outputting a data record representing the short-paid meter adjustment.

According to an embodiment of the disclosed subject matter, a VBI meter system apparatus is provided to dispense evidence of a short-paid adjustment. The apparatus of this embodiment includes at least one processor and memory coupled to the processor that causes the processor to handle a request for short-paid adjustment evidence, identify, within data stored in memory, at least one short-paid adjustment, and output the short-paid adjustment evidence.

According to an embodiment of the disclosed subject matter, a VBI meter system is provided for dispensing evidence of at least one short-paid adjustment. The system of this embodiment includes at least one processor configured to (1) process and identify, record in a VBI meter data set, at least one short-paid adjustment data, the VBI meter data set including one or more data records and (2) output the at least one short-paid adjustment data record, and memory coupled to the processor for storing the VBI meter data sets and data records.

According to an embodiment of the disclosed subject matter, one or more dedicated centralized VBI meter systems in a PES environment at a data center are provided for dispensing evidence of short-paid adjustments for short-paid mail originating in other VBI meter systems belonging to customers of the authorized vendor.

Additional features, advantages, and embodiments of the disclosed subject matter may be set forth or apparent from consideration of the following detailed description, drawings and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification.

The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
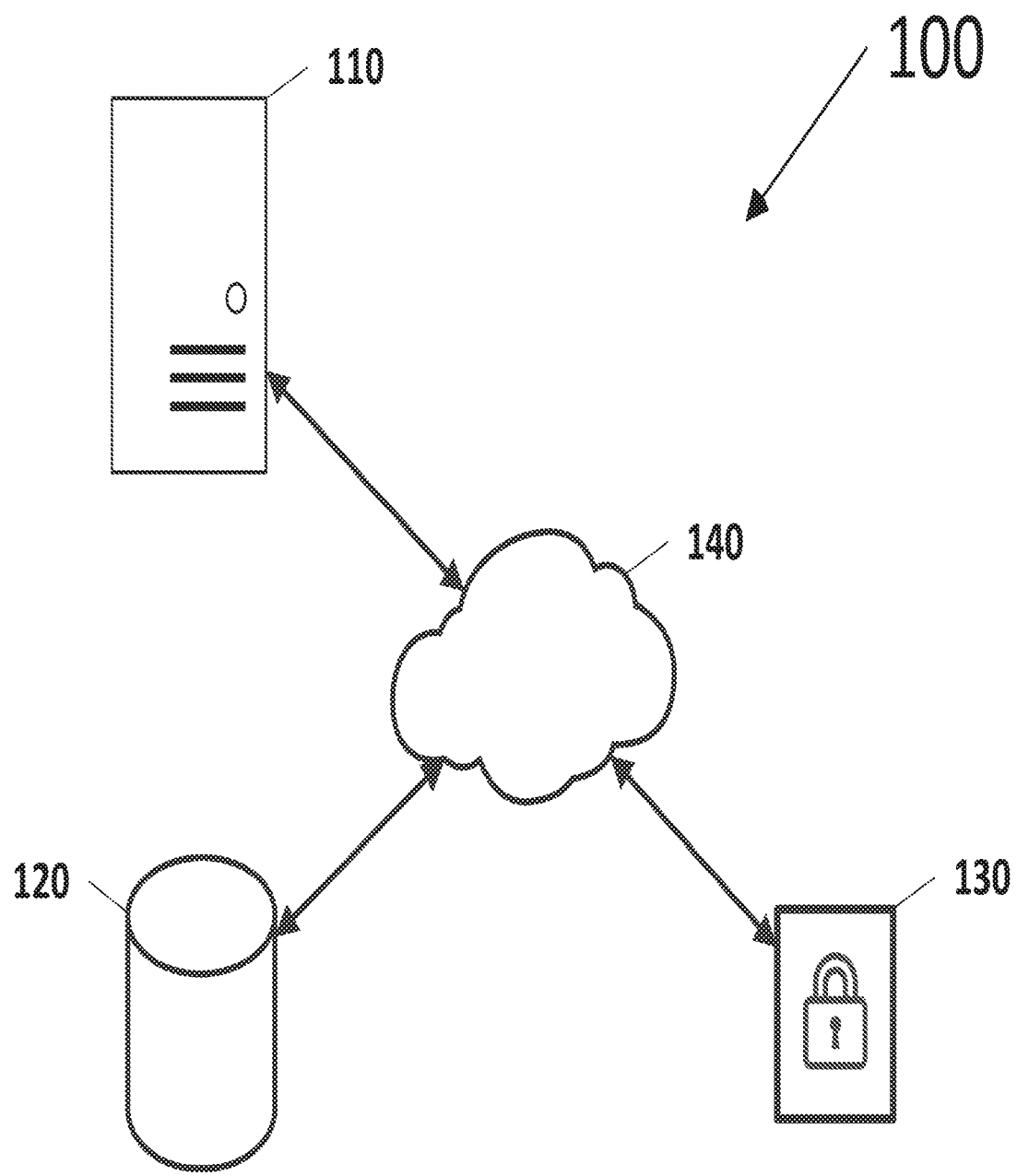
FIG. 1 is a schematic diagram illustrating an example of a system suitable for use with embodiments of the disclosed subject matter.

Ironically, the launch of PC Postage has exacerbated an issue that was created by and has existed in the postal industry as a whole since the evolution of the postage meter: "short-paid" mail. It arises from the delivery of mail and parcels that do not have sufficient postage to cover the cost for delivery. It has caused and continues to cause a deficit to post offices annually; regardless whether due to the cost of extracting payment from senders, the cost of returning items for insufficient funds or the cost of simply completing delivery of those items without any attempt to recoup the postage amount deficiency. In the U.S. alone, for example, the short fall to the USPS due to short-paid mail resulting from customers using PC Postage totaled $153M in FY 2013, $174M in FY 2014, and $199M in FY 2015, and continues to project upward at an ever-increasing rate.

Others have recognized the possibility of underfunding postage purchases and the resulting short-pay dilemma. See, e.g., U.S. Pat. No. 5,819,239 for METHOD OF VERIFYING PROPER PAYMENT OF POSTAGE, issued on Oct. 6, 1998; U.S. Pat. No. 5,452,654 for POSTAGE METERING SYSTEM WITH SHORT PAID MAIL DETERRENCE, issued on Sep. 26, 1995; and U.S. Pat. No. 5,019,991 for CERTIFIED WEIGHER-SHORT PAID MAIL, issued on May 28, 1991. However, these solutions do not address or resolve the short-paid mail problem that exists in either a closed or an open PES.

In a closed PES environment, short-paid mail may occur in a number of circumstances. Closed PES systems may allow a sender to manually enter in the mail piece attributes (weight, dimensions, conditions of service and zone) for the item to be mailed. Many systems may even allow the sender to generate "keyed-in" postage by allowing the sender to declare the postage value. In either instance, an intentional or unintentional misrepresentation on a mail piece may result in a customer "short-paying" or affixing postage to a mail piece that represents a value that is less than what is required. Short-paid mail may occur if a PES is used to produce the mail piece attributes but using the wrong item for gathering the information (i.e., weighing an empty box to purchase postage and then using that postage to ship a box of rocks). Short-paid mail may occur where a customer weighs two different packages and mixes up the labels for those two packages (thus causing overpayment for one and underpayment for the other). Short-paid mail may occur where a customer selects the wrong condition of service for a mailing, thereby selecting a service that is not allowable given other conditions (i.e., choosing flat rate shipping for something that weighs more than the maximum allowed 70 lbs in order to get a cheaper shipping rate). Short-paid mail may occur where a customer misrepresents the zone, such when the customer generates postage for an origin zip code that is closer to the destination than the actual origin zip code in which the mail piece enters the mail stream, resulting in less postage.

Short-paid mail, similarly, may occur in a PC Postage system where a customer manually and intentionally or unintentionally enters incorrect dimensions or weight of parcels to be shipped as part of the postage indicia purchase process and secures a lower postage rate for those parcels based on an inaccurately entered lower weight or smaller dimensions. Short-paid mail may occur in a PC Postage system where a customer printing their own shipping labels to complete an indicia purchase transaction, pays for one indicium but prints a single shipping label ten times, for example, and uses the nine additional labels to ship nine additional parcels for "free". Still other instances of short paid mail may occur where, for example, mail was posted for a presort discount and there are insufficient mail pieces in a particular zip to qualify for that discount.

The short-paid mail problem began with the introduction of the mechanical postage machine. It has not been solved by the advent of the electronic postage machine. And, as discussed hereinabove, it represents an ongoing and ever increasing financial burden to the postal industry globally, and to the USPS in particular.

Short-paid mail also may occur due to hardware or software errors in the system and devices that generate shipping labels. For example, an electronic postage machine may malfunction due to a hardware fault, may store and use out-of-date or otherwise inaccurate rate tables to generate postage, or may otherwise generate short-paid mail despite operator intention to generate accurate postage.

Short-paid mail may be relatively difficult to correct. In conventional non-electronic mail systems, a mailer may simply be notified by a mail carrier that a particular mail piece has not been provided sufficient postage, and thus will not be transported by the carrier. However, in modern electronic systems, mail pieces often enter a mail stream in a relatively automated fashion, such that it would be inefficient or otherwise undesirable to remove short-paid mail from the mail stream so as to require additional action from the sender. Similarly, it may be inefficient or undesirable to request payment of short-paid mail shortfalls subsequent to delivery, due to the difficulty of determining a particular sender for a short-paid mail piece. Finally, the nature of modern electronic postage systems prohibits automated or semi-automated systems directed to obtaining payment of short-paid mail automatically, since PSDs and similar devices are cryptographically secured against unauthorized or arbitrary addition or removal of funds. Accordingly, an automated short-paid mail withdrawal system may not be possible outside of the systems and techniques disclosed herein.

Thus, there is a need for a system and a method for reconciling instances of short-paid mail, regardless of the method or source of post that enables identification of the source and redress of any payment deficiency.

There is a need for a system and a method for reconciling instances of short-paid mail identified by a service provider that requires electronic payment via indicia that fulfills PSD security requirements and prevents the reconciling indicia from entering the mail stream, for example, through the use of a dedicated and centralized system for electronically generating reconciling indicia that is not accessible to the sender.

There is a need for a system and a method for reconciling instances of short-paid mail identified by a service provider that requires electronic payment via indicia that fulfills PSD security requirements but does not require communication to a short-paid source, such as a postal meter or franking machine, for example, through the use of centralized dedicated systems to facilitating all processing of short-paid adjustments.

There is a need for a system and a method for reconciling instances of short-paid mail that enables a service provider or authorized vendor to maximize the value of recovery efforts such as, for example, through the use of intelligence to process short paid adjustments.

There is a need for a system and a method for reconciling instances of short-paid mail that enables a service provider or authorized vendor to maximize the value of recovery efforts such as, for example, through the ability to process partial short-paid adjustments.

There is a need for a system and a method for reconciling instances of short-paid mail that enables a service provider or authorized vendor to maximize the value of recovery efforts such as, for example, through the use of dedicated systems to facilitating all processing of short-paid adjustments.

There is a need for a system and a method that allows for the tracking of short-paid adjustments and the reconciliation of the short-paid adjustments.

There is a need for a system and a method that utilizes data associated with requests for short-paid adjustments to identify issues within a VBI meter system and to provide quality assurance.

There is a need for a system and a method for reconciling instances of short-paid mail that enables a short-paid adjustment to be performed upon receipt or at any predetermined schedule/time.

There is a need for a system and a method for reconciling instances of short-paid mail that enables the reduction, if not elimination, of shortfall as a result of consumer error, misuse or fraud in generation or application of indicia to mail pieces or parcels introduced into the mail stream.

There is a need for a centralized VBI meter short-paid adjustment system that enables existing technology (i.e., remote physical VBI meter systems like franking machines) to perform a short-paid adjustment upon request.

There is a need for a centralized VBI meter short-paid adjustment system that enables existing technology (i.e., remote physical VBI meter systems like franking machines) to secure and restrict access to any short-paid indicia generated in response to a short-paid adjustment request to only the authorized vendor and the service provider.

There is a need for a system and a method for reconciling instances of short-paid mail that improves existing technologies by providing a mechanism that enables an authorized vendor to use existing vendor systems to audit processes and detect errors in configuration (i.e., the rate file used for determining postage value) or malfunctions in hardware (i.e., a weighing platform or automated parcel dimension meter).

There is a need for a system and a method for reconciling instances of short-paid mail that improves existing technologies by providing a mechanism that enables an authorized vendor to use existing vendor system to audits processes and detect misuse or fraud within a customer's current mailing and shipping processes.

The systems and techniques discloses herein may address these needs, as well as providing solutions to other shortcomings and problems with current technologies.

FIG. 1 schematically illustrates an example system 100 that may implement short-paid reconciliation methods in accordance with the disclosed subject matter of the present invention. System 100 may include a processor 110, a data store or database 120, a value bearing item (VBI) meter system 130, and a network 140 for providing connectivity and communication. Network 140 may also include a POTS (plain old telephone service) network (not shown). System 100 also may include a client hardware/software system (not shown).

System 100 may be configured in several ways. In an embodiment, system 100 may include client hardware/software systems a client and may be configured such that the client system connects over network 140 to processor 110 and data store 120 and VBI meter system 130 are each connected to the processor 100. In another embodiment, system 100 may be configured such that VBI meter system 130 may be connected to network 140 and processor 110 is connected to data store 120. In yet another embodiment, system 100 may be configured such that VBI meter system 130 may be connected to a client system, and the client system connects over network 140 to processor 110, which connects with data store 120. Still other configurations for system 100 will be known to those skilled in the art.

Processor 110 may be a CPU that sits on a PC or a server. Processor 110 may include volatile and non-volatile memory that executes code to perform functions. Processor 110 may execute code to perform functions including services that may be accessible from external systems.

Data store or database 120 may include a database or a series of files in a file system or in memory. Data store 120 may exist in volatile or non-volatile memory. Data store 120 may be accessible by the processor. Data store 120 may be secure.

VBI meter system 130 may contain a meter that may be used for generating a metering value such as indicia or any other elements that represent financial value. VBI meter system 130 may represent a postal evidencing system (PES). VBI meter system 130 may represent a meter and a host/base. The meter may be a postal secure device, or PSD. The VBI meter system may be remote from a data center or contain components that are from a data center, such as in a remote secure module (RSM), a franking machine in a closed PES environment, or it may be local to the data center, such as in a virtual PSD (vPSD), a centralized PSD or in a centralized secure module (CSM) in an open PES environment. VBI meter system 130 may contain firmware running on proprietary hardware, software running on standard hardware, or a combination of both. VBI meter system 130 may include a meter and an interface, such as, for example, a base/host, for physical PSDs or a service running on a server for vPSDs to the meter. VBI meter system 130 may dispense value or remove money to the meter through or using the meter interface. VBI meter system 130 may add value or money to the meter through or using the meter interface, such as, for example, in a meter reset. VBI meter system 130 may reconcile short-paid mail payments in accord with the present invention. VBI meter system 130 may be secure such that it is tamper-proof or limits or restricts access to data. VBI meter system 130 may use encryption to enhance security. VBI meter system 130 may keep track of all of the money or value that is dispensed and all of the money or value that it has available.

Network 140 may include a LAN, WAN and/or POTS network. Processor 110 and data store 120 may be connected via a LAN or WAN. VBI meter system 130 may be connected to processor 110 via a LAN, WAN or POTS.

A client system may access system 100 via the internet or a telephone service provided by a data center (not shown). The client system may be local and reside between the VBI meter system 130 and processor 110. Alternatively, the client system may be remote and may be one of an executable running on a PC, a hardware component such as a franking machine containing a PSD, an executable running on a PC connected to VBI meter system 130 locally, a web-based application invoked from a PC remote from data store 120, or a web-based application invoked from a PC connected to VBI meter system 130 and remote from data store 120.

Figure 2:
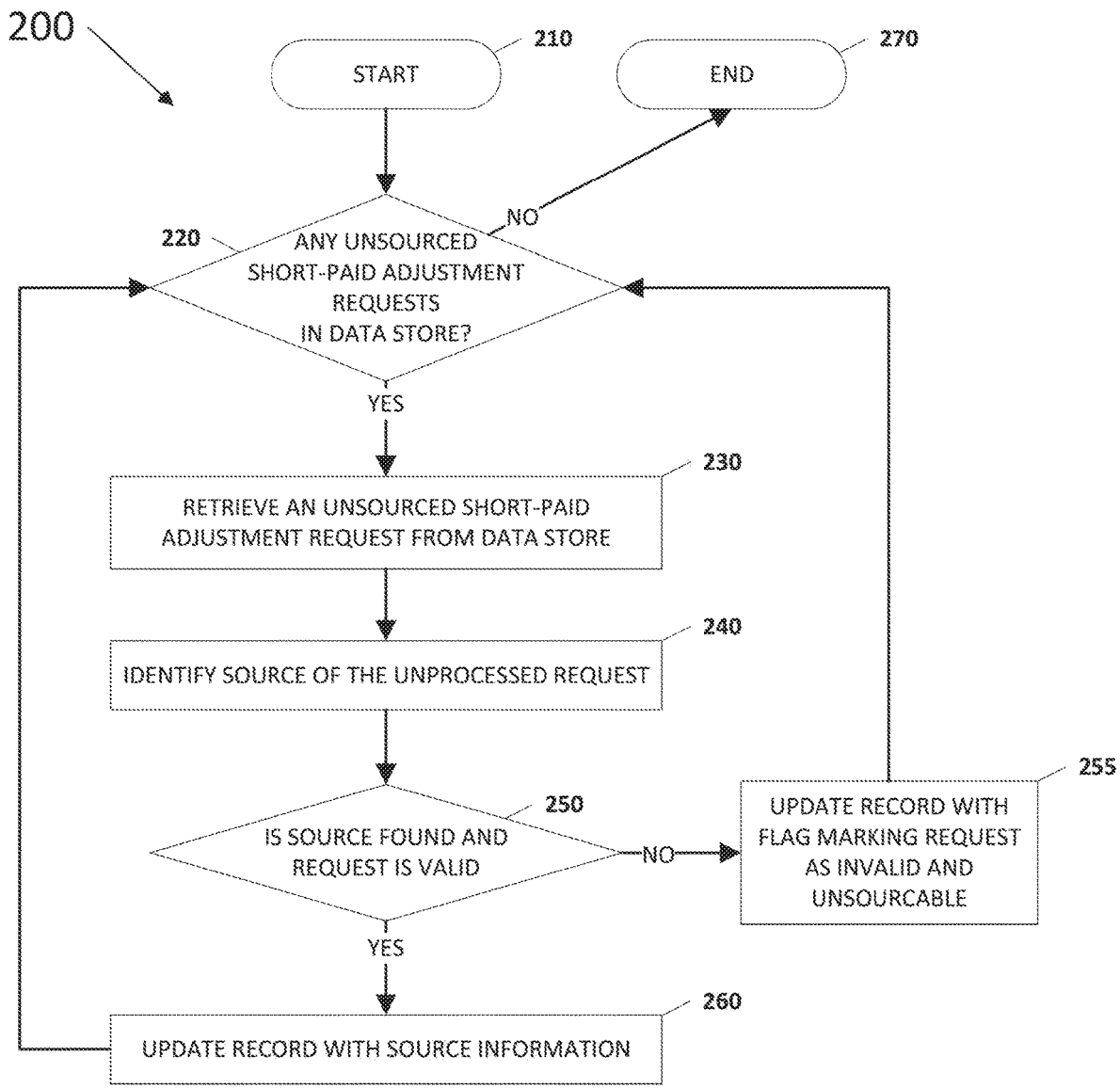
FIG. 2 is a flowchart illustrating an example sourcing process according to an embodiment of the disclosed subject matter.

FIG. 2 illustrates a process 200 according to the present invention for identifying a source or "sourcing" a short-paid adjustment request. Process 200 may be performed at any point in a day or evening, or according to a pre-determined schedule or upon detection by system 100 of the presence of a short-paid adjustment request file from the initiator. Preferably, process 200 is performed once a day. However, one skilled in the art will recognize that process 200 may be initiated by still other time or event triggers known in the art, as well.

A "source" may be an originator of the VBI that needs to be adjusted. The source may be a user account, a meter serial number, a meter account and/or a funding account. An authorized vendor may receive a short-paid adjustment request from a service provider in the form of a file. Upon receipt, the contents of the file are imported into and stored in the data store 120. An "adjustment request" is a single record and a single instance of deficient postage for which a request is made to cure the deficiency. The file may contain one adjustment request, multiple adjustment requests or no adjustment requests. Once the file contents are stored, the vendor may process the file, for example, by finding the source of each individual adjustment request contained within the file. The vendor may continue this process until each request is sourced or deemed invalid.

Process 200 uses a VBI identifier value included within a short-paid adjustment request that uniquely identifies a deficient VBI that needs to be adjusted. The VBI identifier value can be in the form of the VBI itself, such as an indicia, it may be in the form of a tracking ID, or it may occur in any form that may help to identify a specific singular VBI.

Process 200 begins at step 210 with short-paid adjustment requests that are stored in data store 120 and have yet to be processed. In step 220, process 200 queries system 100 for any unsourced short-paid adjustment requests that are present in data store 120. If no such short-paid adjustment requests are present, process 200 proceeds to step 270. In step 220, if it is determined that there are short-paid adjustment requests yet to be validated and sourced in data store 120, process 200 continues to step 230, where an unsourced short-paid adjustment request is selected for processing. In step 240, a source for the unprocessed request is identified by taking the identifier that was used in the short-paid adjustment request and matching it with data that is stored in the data center to determine the source that generated the deficient VBI. In step 250, process 200 determines if the attempt to find the source is successful and, if so, process 200 proceeds to step to 260. If unsuccessful, in step 255, process 200 marks or flags the short-paid adjustment request as invalidate or "unsourceable", meaning that a source for a particular request cannot be identified, and returns to step 220.

In step 260, process 200 updates the short-paid adjustment request record (and may be stored in data store 120) to provide a reference identifier relating to the now identified source and returns to step 220. Thereafter, if no un-sourced short-paid adjustment requests remain in the data store 120, process 200 proceeds to step 270 and ends.

Upon completion of process 200, the authorized vendor may perform a process to assess the aggregate value of the money needed to satisfy the short-paid adjustment requests, and may evaluate that aggregate value against the funds available on the meter in a VBI meter system 130. This assessment may be done on a per-meter per-VBI meter system basis and using only VBI meter systems with associated meters that are accessible from the data center. A VBI meter system 130 may include a single meter or multiple meters, and may include one or more locally or remotely connected meter systems.

If the available funds are less than the aggregate value to be reconciled then process 200 may invoke a meter reset in each local or remote system that is accessible to the data center. If the available funds are sufficient to complete the process 200, a meter reset may not be invoked. In another embodiment of the present invention, process 200 may invoke a meter reset for the full amount of the aggregate value regardless of the funds present in the meter. In still another embodiment, meter resets related to the short-paid adjustment will not occur immediately after process 200 is completed.

Figure 3:
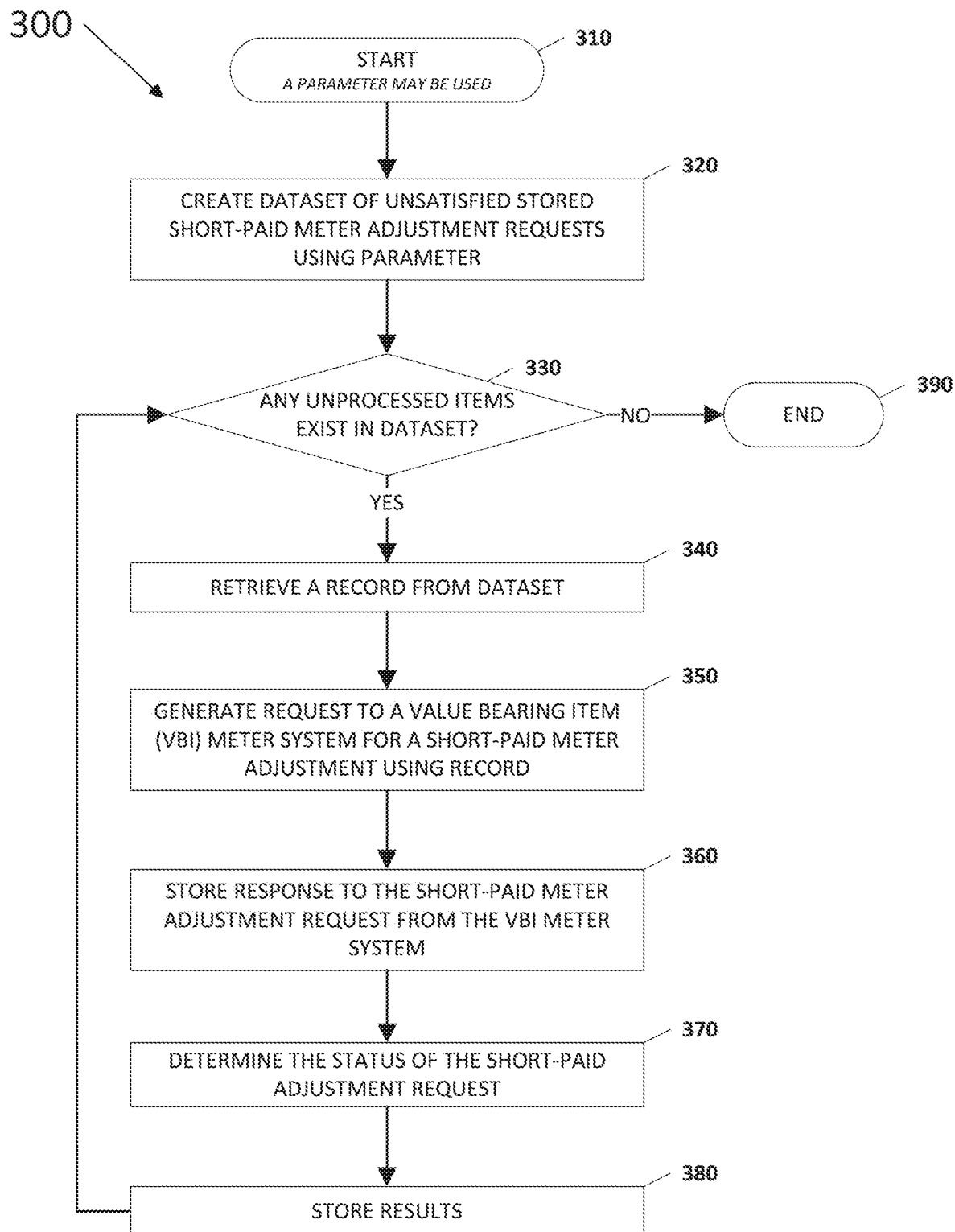
FIG. 3 is a flowchart illustrating an example short-paid adjustment process according to an embodiment of the disclosed subject matter.

FIG. 3 illustrates a process 300 according to the present invention for invoking a short-paid adjustment from the VBI meter system 130. Process 300 may create a dataset of unsatisfied short-paid meter adjustment requests. Alternatively, process 300 may receive specific parameters for performing adjustments on a specific subset of short-paid adjustment requests.

Process 300 may be triggered without a parameter and all unsatisfied short-paid adjustment requests for VBI meter systems that are accessible to the data center will be processed. Triggers for process 300 may include the completion of the sourcing process, a meter reset, a remote VBI meter system connection, a time or an external process trigger. Process 300 will always be triggered at a point after process 200 is completed. As one skilled in the art will recognize, however, any of the other above events may trigger process 300 as well.

A meter reset may occur when a source initiates a request to a VBI meter system 130 to add funds and/or value to a meter. System 100 may be configured to cause a meter reset to trigger operation of the short-paid adjustment process regardless of the location of VBI meter system 130. That is, the system may cause a meter reset operation regardless of whether VBI meter system 130 is remote or local to a data center.

A remote VBI meter system connection arises where VBI meter system 130 is remote from and periodically establishes a connection with a data center. Since the connection is periodic and is controlled by the remote VBI meter system 130, the opportunity to reconcile a short-paid adjustment may be limited to those occasions when remote VBI meter system 130 establishes a connection to the data center.

Time, as a trigger, may refer to a configurable moment in time that triggers an event. That moment in time may be a single or a recurring moment. The moment in time in a preferred embodiment, more probably than not will be recurring, but a single moment instance is possible, as well.

Any external process may be configured to trigger or run process 300. An example of an external process that may act as such a trigger is each time an internal financial transaction occurs with respect to a source. Still other such examples will be known to those skilled in the art.

As shown in FIG. 3, a trigger initiates process 300. Process 300 begins at step 310, where a parameter may be passed into process 300 and used to filter the unsatisfied sourced short-paid adjustments requests to be processed. The parameter may represent something that is individual to a particular source, a specific VBI transaction, a date range, or a combination thereof. Alternatively, no parameters may be passed into process 300, allowing the system to attempt to process all unsatisfied sourced short-paid adjustments that are available to be processed.

Once the parameters are determined, process 300 passes to step 320, where a data set or collection of unsatisfied sourced short-paid meter adjustment requests is generated based on the parameter(s) used.

At step 330, the data set is evaluated for the existence of records within the data set. Where a source has a short-paid balance, process 300 may proceed through successive steps 340-380 to a conclusion and end at step 390. Where a source has no short-paid balance, however, process 300 may be triggered by the source's addition of additional value or money, but process 300, thereafter, will proceed to step 390 and end.

At step 340, process 300 begins to cycle through the records found by selecting a single record from the data set. In an embodiment, the "cycle" or order in which a record is selected may be random. In another embodiment, the "cycle" or order in which a record is selected may be determined based on an algorithm or intelligence that maximizes the total amount of VBI to be recovered from a specific meter within a VBI meter system 130 in satisfaction or fulfillment of the short-paid adjustment request. For example, where a specific meter from which VBI is to be recovered has sufficient funds to satisfy only a subset of short-paid adjustment requests, the requests may be processed so as to fulfill the maximum number of requests possible. Alternatively, the requests may be processed so as to maximize the total amount of VBI recovered, regardless of the number of associated requests that are satisfied. In another embodiment, the "cycle" or order in which a record is selected may be based on a source, the age of the original VBI transaction and/or the adjustment amount. In yet another embodiment, process 300 may trigger a meter reset for the value of the adjustment. As one skilled in the art will recognize, process 300 may be performed using multiple criteria as well as single criteria. Moreover, sorting by the age of the original VBI transaction or adjustment amount may occur in an increasing or decreasing date or amount, respectively.

In another embodiment, intelligence may be employed to perform steps 330 and 350 of process 300 to predetermine the short-paid adjustments that will be sent to VBI meter system 130 and the order in which they are processed. In this embodiment, predetermination of short-paid adjustments may be based off of other intelligence which that optimizes performance of the process 300 by sending to the VBI meter system 130 only those requests that may be expected to return either a full or a partial adjustment in response to a short-paid meter adjustment request.

At step 350, a request to VBI meter system 130 is generated that identifies a short-paid meter adjustment that requires reconciliation on VBI meter system 130.

At step 360, the response from VBI meter system 130, in reply to the short-paid meter adjustment request, is received and stored. The response may reflect evidence of a full adjustment, a partial adjustment, no adjustment (for example, due to insufficient funds), or an error due, for example, to an invalid request or a system error.

At step 370, the response is evaluated and an overall status is ascribed to the short-paid adjustment request received from the initiator. The status may indicate a fully or partially satisfied short-paid adjustment request from the initiator. Alternatively, the status may indicate an invalid adjustment request or a short-paid request that has not been adjusted in any manner. In an embodiment, at step 370, process 300 may trigger a meter reset.

Figure 4:
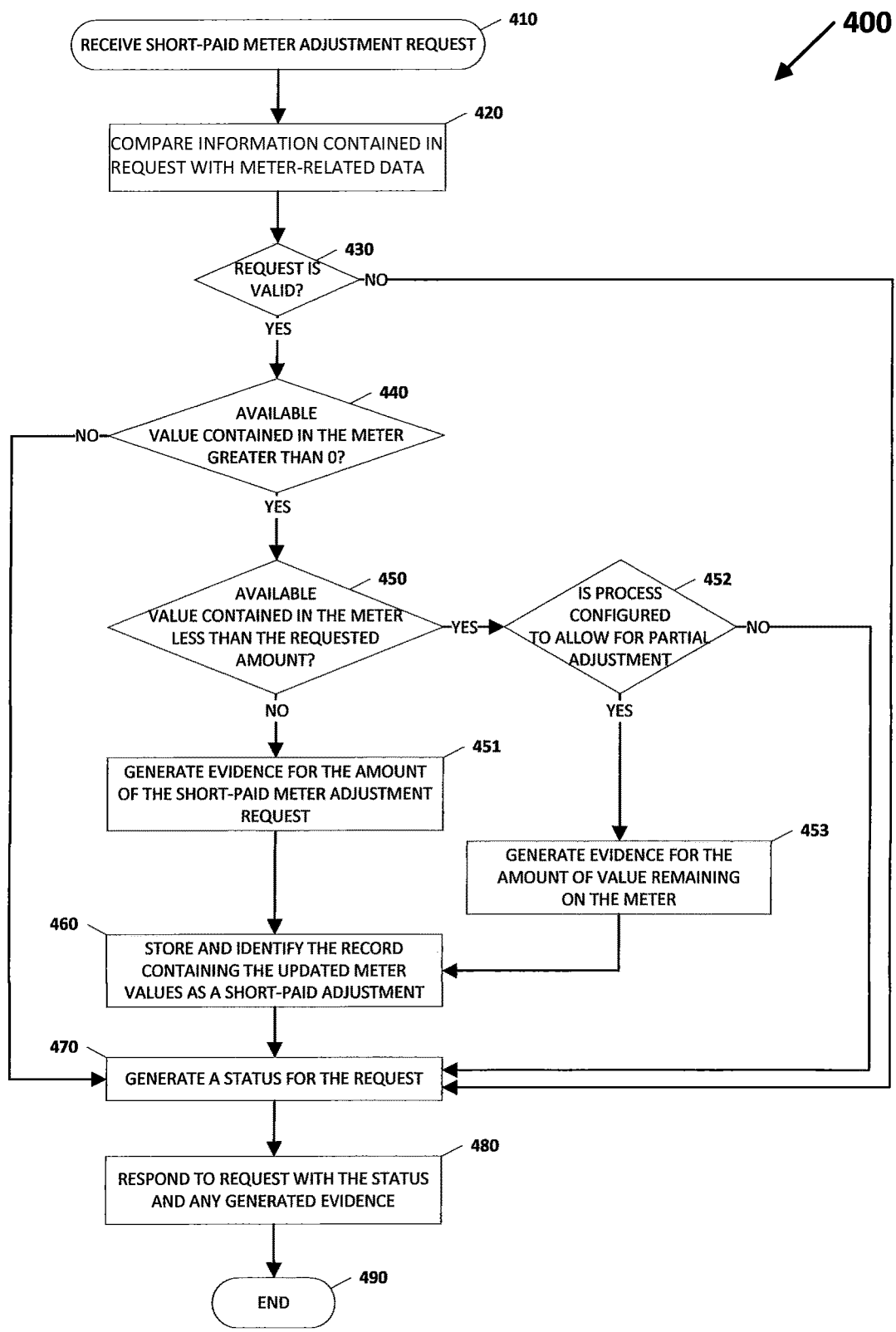
FIG. 4 is a flowchart illustrating an example short-paid evidence generation process according to an embodiment of the disclosed subject matter.

At step 380, the status determination from step 370 is stored in data store 230 and may be used to determine whether the record will require future additional short paid processing or will be part of the output shown in FIG. 4. The process ends at step 390.

Process 300 may cycle through every unprocessed record in the data set and will attempt an adjustment regardless whether any funds are available. There may be unsatisfied adjustment requests that were not able to be reconciled due to a lack of funds.

A meter reset may be invoked or triggered based on the result of the short paid adjustment process for any partially adjusted or unadjusted short paid adjustment attempts that resulted without error. Any instances of short paid adjustment process attempts that result in a system error will be recycled and an attempt to re-process those requests for short-paid adjustment will occur automatically. If a request results in more than a configurable number of system error responses, those attempts may be logged and re-attempted at a future configurable date. Any processes that invoked a meter reset may then be re-attempted. If a request results in an invalid status, the short paid adjustment is updated to reflect an invalid request.

FIG. 4 illustrates an example process 400 for operating VBI meter system 130 in accord with the disclosure of the present invention.

Process 400 begins at step 410 upon receipt of a short-paid meter adjustment request. In step 410, more than one parameter may be used, such as parameters that are used for meter resetting, for VBI generation and for generating evidence of a meter adjustment.

In step 420, receipt of the short-paid meter adjustment request may trigger a comparison of the information in this request with meter-related data.

In step 430, process 400 may determine the validity of the short-paid adjustment request based on the results of the comparison. Alternatively, in another embodiment, the validity of the short-paid adjustment request may be based on the ability to find the original VBI transaction record and determining whether it exists in the meter data. In still another embodiment, the validity of the short-paid adjustment request may be based on the completeness of the request.

Process 400 next proceeds to step 440 if the request is determined to be valid. If the request is determined to be invalid, process 400 proceeds to step 470.

In step 440, the results of the comparison in step 430 are used to determine whether the available value contained in the meter is greater than zero, i.e., it has some value. If so, process 400 proceeds to step 450. If not, process 400 proceeds to step 470.

In step 450, the results of the comparison in step 440 are used to determine whether the available value contained in the meter is less than the amount of the short-paid adjustment request. If so, process 400 proceeds to step 452. If not, process 400 proceeds to step 451.

In step 451, process 400 generates evidence within the meter for the full value of the short paid adjustment request. Such evidence may be in the form of proof that an adjustment has been made, for example, or it may be in the form of value, such as a VBI or an indicia.

In step 452, process 400 determines whether the system allows for partial adjustment. If so, process proceeds to step 453. If not, process 400 proceeds to step 470.

In step 453, process 400 generates evidence within the meter of the amount of value that is remaining on the meter.

In step 460, the evidence of step 451 and step 453 is stored and identified as a short-paid adjustment.

In step 470, a status is generated for the short-paid meter adjustment request as a result of process 400. The status may include evidence of a full adjustment, a partial adjustment, no adjustment, a validation error or a system error.

In step 480, process 400 responds to the short-paid meter adjustment request by providing the status and any generated evidence. Process 400 concludes at step 490.

While process 400 interfaces with a meter within a VBI meter system 130 (and while process 300 interfaces with the VBI meter system 130 through process 400), other systems or components may interface with VBI meter system 130 as well. Such systems may include a meter resetting system or systems that request or consume VBI, including client or server systems. In an embodiment, VBI meter system 130 may be dedicated to reconciling short-paid adjustment requests.

Figure 5:
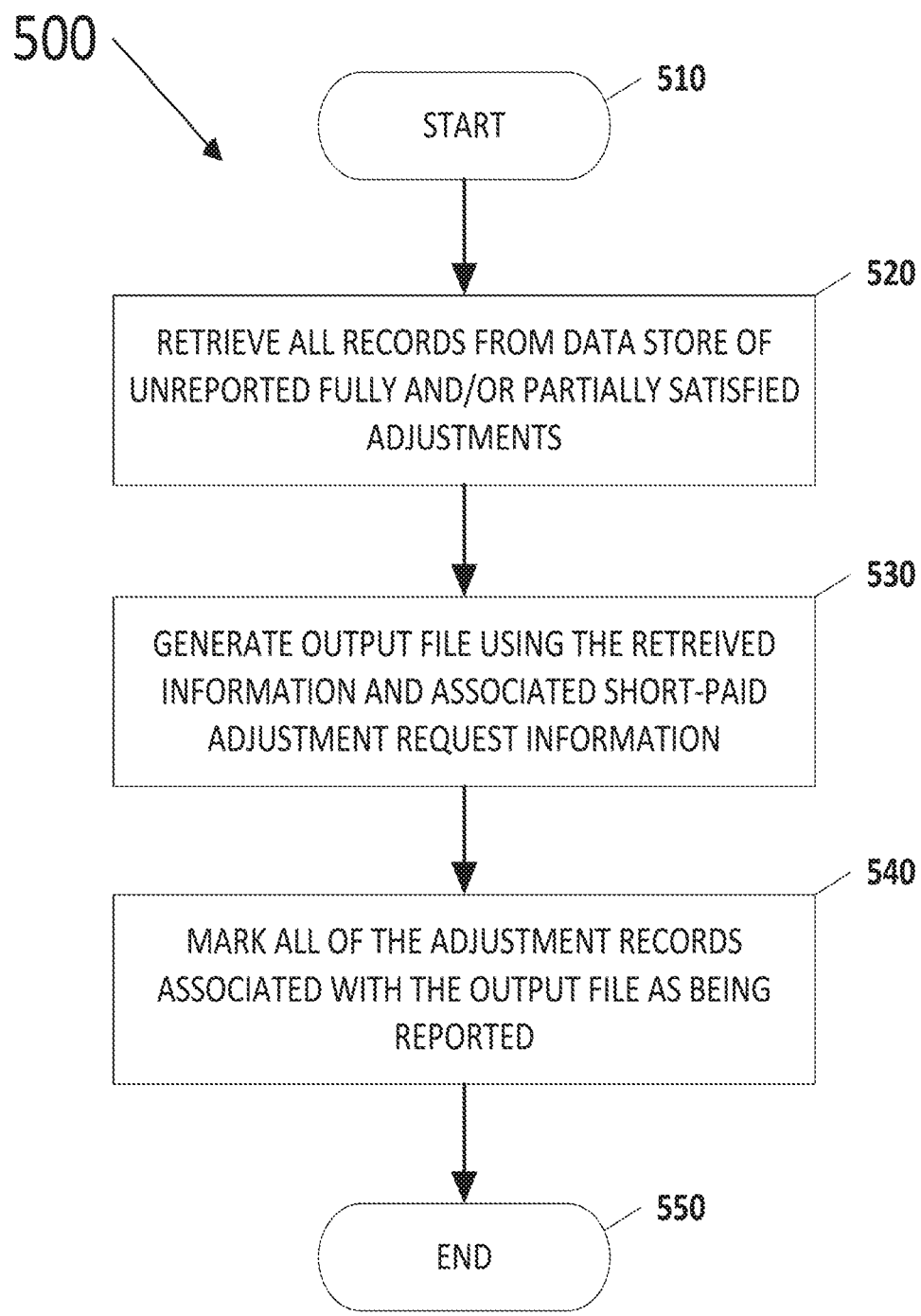
FIG. 5 is a flowchart illustrating an example output file generation process according to an embodiment of the disclosed subject matter.

FIG. 5 illustrates process 500 for generating a file containing evidence of the fully and/or partially satisfied short-paid adjustment requests according to the disclosure of the present invention.

Process 500 begins at step 510. In step 520, all previously unreported records that represent fully and/or partially satisfied short-paid adjustments are retrieved from the data store.

In step 530, process 500 generates and saves an output file that contains the selected records derived from step 520. In an embodiment, the output file may be stored in a location that is accessible by the initiator. In another embodiment, the output file may be sent or transmitted to the initiator.

In step 540, process 500 marks those short-paid adjustment request records contained in the output file as being reported. Process 500 concludes at step 550.

Figure 6:
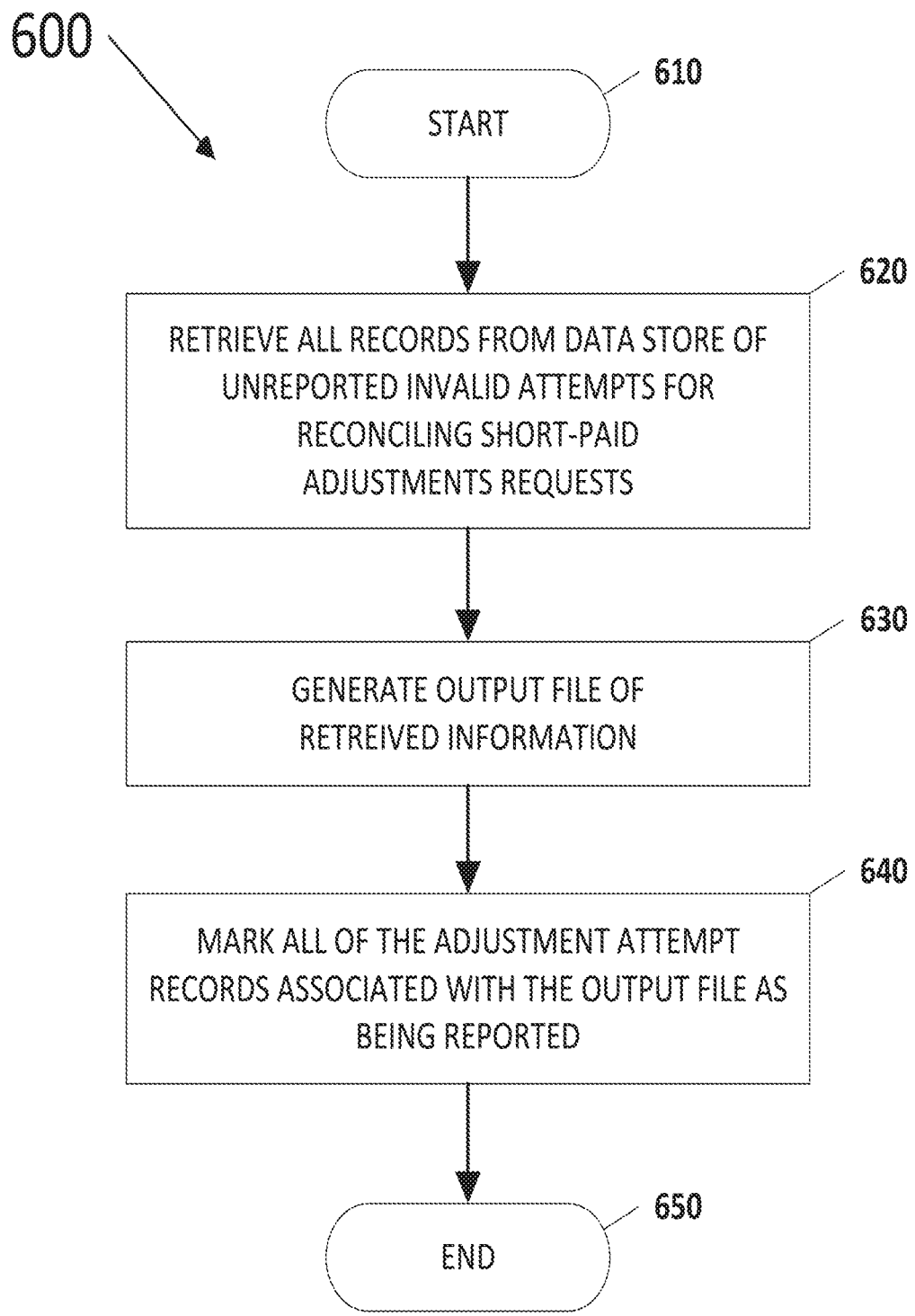
FIG. 6 is a flowchart illustrating another example output file generation process according to an embodiment of the disclosed subject matter.

FIG. 6 illustrates a process 600 for generating a file that contains all unreported invalid attempts for reconciling short-paid adjustment requests according to the disclosure of the present invention.

Process 600 begins at step 610. In step 620, process 600 retrieves all previously unreported records from the data store that represent invalid attempts for reconciling short-paid adjustment requests.

In step 630, process 600 generates and saves an output file that contains the selected records derived from step 620. In an embodiment, the output file may be stored in a location that is accessible by the initiator. In another embodiment, the output file may be sent or transmitted to the initiator.

In step 640, process 600 marks those invalid short-paid adjustment attempts contained in the output file as being reported. Process 600 concludes at step 650.

Files generated by process 500 and/or process 600 may include output files and reports, and may contain information that would represent no short-paid adjustments performed or invalid short-paid adjustments discovered. In an embodiment, the generation of the output files or reports is triggered by the completion process 400. In another embodiment, generation of the output files or reports is configurable based on a desired time that is dictated by an external source such as, e.g., the initiator or a separate process. In another embodiment, generation of the output files or reports is configurable based on a desired event that is dictated by an external source such as, e.g., the initiator or a separate process. As one skilled in the art will recognize, output files or reports may be formatted to fit the requirements of the initiator or process.

As previously disclosed, embodiments may allow for short-paid mail to be properly accounted for, without violating the security of PSDs and similar devices associated with the generation of short-paid mail. Thus, the present disclosure provides techniques suitable for addressing the foregoing issues regarding short-paid mail, while operating within the technical requirements and limitations of existing mail systems.

Systems and techniques disclosed herein also may allow for identification of electronic postage systems that may be malfunctioning, using outdated or inaccurate rate tables, or the like. For example, upon identifying a source at 250, an associated device may be identified as the device used by the source to generate short-paid mail. Accordingly, the device may be identified as a potentially malfunctioning device, a device in need of a software or data update, or the like. Thus, the techniques disclosed herein for identifying short-paid mail also may solve related problems in modern electronic postage systems.

According to an embodiment of the disclosed subject matter, a method is provided to reconcile a short-paid adjustment request received from an initiator that includes the steps of storing at least one short-paid adjustment request from the initiator, identifying at least one source for the short-paid adjustment request, generating a request to a VBI meter system for a short-paid meter adjustment based on the at least one identified source, storing the VBI meter system response to the short-paid meter adjustment request, and generating at least one file to the initiator based on the VBI meter system response to the short-paid meter adjustment request. The method may further include the step of validating the short-paid adjustment request prior to or in conjunction with the source identification. The method also may further include the step of determining the status of the short-paid adjustment request following the step of receiving the response to the short-paid meter adjustment request. The source may be selected from the group consisting of a user account, a meter serial number, a meter account, and a funding account. The VBI meter system response may be at least one of a VBI, a non-VBI, adjusted meter register values, evidence of a short-paid adjustment, a non-response or an error. The file may include at least one of evidence of at least one meter adjustment performed in response to the short-paid meter adjustment request or at least one invalid short-paid adjustment request.

According to an embodiment of the disclosed subject matter, a method is provided to reconcile a short-paid adjustment request received from an initiator that includes the steps of generating a request to a VBI meter system for a short-paid meter adjustment based on a prior short-paid meter adjustment request, storing the VBI meter system response to the short-paid meter adjustment request, determining the status of the short-paid adjustment request, and generating at least one file to the initiator based on the response to the short-paid meter adjustment request. The prior short-paid meter adjustment request may be one of at least one of a partial adjustment, no adjustment or a system error. The response to the short-paid meter adjustment request may be at least one of a full adjustment, a partial adjustment, no adjustment, a validation error or a system error.

According to an embodiment of the disclosed subject matter, a system is provided where a non-transitory computer-readable medium uses processor-executable instructions stored therein and configured to cause a processor to initiate storing at least one short-paid adjustment request from an initiator, identifying at least one source for the short-paid adjustment request, generating a request to a VBI meter system for a short-paid meter adjustment based on the at least one identified source, storing the VBI meter system response to the short-paid meter adjustment request; and generating at least one file to the initiator based on the VBI meter system response to the short-paid meter adjustment request. The processor-executable instructions may further include instructions configured to initiate causing the processor to validate the short-paid adjustment request prior to or in conjunction with the source identification. The processor-executable instructions may also further include instructions configured to initiate causing the processor to determine the status of the short-paid adjustment request following the step of receiving the response to the short-paid meter adjustment request. The VBI meter system response according to this embodiment, moreover, may be one of a VBI, a non-VBI, an adjusted register value, evidence of a short-paid adjustment or an error.

According to an embodiment of the disclosed subject matter, a system is provided where a non-transitory computer-readable medium uses processor-executable instructions stored therein and configured to cause a processor to initiate generating a request for a short-paid meter adjustment based on a prior short-paid meter adjustment request, storing a response to the short-paid meter adjustment request, determining the status of the short-paid adjustment request, and generating at least one file to an initiator based on the response to the short-paid meter adjustment request.

According to an embodiment of the disclosed subject matter, a system is provided for reconciling at least one short-paid adjustment request received from an initiator that includes a VBI meter system for generating evidence of a short-paid adjustment and a processor coupled to the VBI meter system. In the system of this embodiment, the processor is configured to process and identify one or more sources of the short-paid adjustment request, invoke a short-paid meter adjustment request for a value adjustment to the VBI meter system based on at least one short-paid adjustment request, and generate at least one file for the initiator based on the VBI meter system response to the short-paid meter adjustment request.

According to an embodiment of the disclosed subject matter, a system is provided for reconciling at least one short-paid adjustment request received from an initiator that includes a network, a VBI meter system coupled to the network for generating evidence of a short-paid adjustment, and a processor coupled to the network. The processor may be configured to process and identify one or more sources of the short-paid adjustment request, invoke a short-paid meter adjustment request for a value adjustment to the VBI meter system based on at least one short-paid adjustment request, and generate at least one file for the initiator based on the VBI meter system response to the short-paid meter adjustment request. The system may further include at least one additional processor for validating, sourcing, accounting and processing the short-paid adjustment request to the VBI meter system. The system may further include at least one additional processor for validating, sourcing, accounting and processing the short-paid adjustment request to the VBI meter system. The system may further include a data store coupled to the network for storing data associated with the short-paid adjustment request, sourcing data, and data associated with VBI meter system responses. The system may further include a data store that is remotely coupled to the network and is part of an independent system for storing data associated with the short-paid adjustment request, sourcing data, and data associated with VBI meter system responses. The network may be configured to facilitate at least one of communication of a request for a short-paid meter adjustment request, transmitting a response to the short-paid meter adjustment request including at least one of a full adjustment, a partial adjustment, no adjustment, a validation error or a system error and communication of the at least one file to the initiator based on the VBI meter system response to the short-paid meter adjustment request. The VBI meter system may be remotely coupled to the network. The processor may be further configured to validate the short-paid adjustment request. The processor may process responses from the VBI meter system before generating the at least one file for the initiator.

According to an embodiment of the disclosed subject matter, a method is provided for reconciling at least one short-paid adjustment request received from an initiator that includes storing at least one short-paid adjustment request from the initiator, identifying at least one source for the short-paid adjustment request, generating a request to a VBI meter system for a short-paid meter adjustment based on one or both of the at least one source or a prior short-paid meter adjustment request, storing the VBI meter system response to the short-paid meter adjustment, determining the status of the short-paid adjustment request, and generating at least one file for the initiator based on the VBI meter system response to the short-paid meter adjustment request.

According to an embodiment of the disclosed subject matter, a system is provided where a non-transitory computer-readable medium uses processor-executable instructions stored therein and configured to cause a processor to initiate storing at least one short-paid adjustment request from an initiator, identifying at least one source for each short-paid adjustment request, generating a request for short-paid meter adjustment based on one or both of the at least one source or a prior short-paid meter adjustment request, storing the response to the short-paid meter adjustment request, determining the status of the short-paid adjustment request, and generating at least one file to the initiator based on the response to the short-paid meter adjustment request.

According to an embodiment of the disclosed subject matter, a method is provided to reconcile a short-paid adjustment request received from an initiator that includes the steps of receiving a request for a short-paid adjustment, evaluating an available postage value present on the VBI meter system, updating register values on the VBI meter system, storing, as the short-paid adjustment, a record including at least the updated register values and a short-paid adjustment record indicator value, and outputting at least one of a result status and evidence of the short-paid adjustment. The method may further include the step of determining an adjustment value, wherein the register values on the VBI meter system are updated based on the adjustment value determined. The adjustment value may equal the available postage value on the VBI meter system when the available postage value on the VBI meter system is greater than zero but less than or equal to the value of the short-paid adjustment request. The VBI meter system register values may include an ascending register value and a descending register value. The register values may be updated by increasing the ascending register and reducing the descending register. The method may further include the step of generating a result status, wherein the result status may be generated concurrently with or after the step of storing the short-paid adjustment. The result status may represent at least one of a full adjustment, a partial adjustment, no adjustment, a validation error or a system error. The step of updating register values may further include the step of generating a VBI. The step of updating register values may further include the step of suppressing the generating, the dispensing and/or the printing of a VBI. The evidence of the short-paid adjustment may include at least one of the updated register values, a representation of the updated register values and VBI.

According to an embodiment of the disclosed subject matter, a system is provided where a non-transitory computer-readable medium uses processor-executable instructions stored therein and configured to cause a processor to initiate handling a request for evidence of a short-paid meter adjustment, identifying any available data records representing the short-paid meter adjustments, and outputting any data records representing the short-paid meter adjustments or any data record representing no short-paid meter adjustments.

According to an embodiment of the disclosed subject matter, a VBI meter system apparatus is provided to dispense evidence of a short-paid meter adjustment. The apparatus of this embodiment includes a processor and a memory coupled to the processor that causes the processor to handle a request for short-paid adjustment evidence, identify, within data stored in memory, any available data records representing the short-paid meter adjustments, and output any data records representing short-paid meter adjustments or any data records representing no short-paid meter adjustments.

According to an embodiment of the disclosed subject matter, a VBI meter system is provided for dispensing evidence of at least one short-paid adjustment. The system of this embodiment includes at least one processor configured to (1) process and identify, record in a VBI meter data set, at least one short-paid adjustment data, the VBI meter data set including one or more data records and (2) output the at least one short-paid adjustment data record, and memory coupled to the processor for storing the VBI meter data sets and data records. The at least one processor may be further configured to generate VBI. The method may further include the step of storing the generated at least one short-paid adjustment VBI. The method may further include the step of suppressing the generating of a VBI.

Systems that may implement short-paid reconciliation methods in accordance with the disclosed subject matter of the present invention, such as systems 100, may not be exclusively dedicated to short-paid reconciliation as such systems 100 also may be used for the primary purpose of generating other VBI such as, for example, postage for mail that enters into the mail stream. However, such systems 100 may also be dedicated to the purpose of short-paid adjustments and may include one or more dedicated meters or VBI meter systems.

In a system 100 fully-dedicated to short-paid reconciliation, VBI meter system 130 may be dedicated to short-paid reconciliation in either or both of an "open" or "closed" PES environment. Within this system 100, a meter reset process may be performed after completion of process 200, and may be based either on a single individual or multiple short-paid adjustment request amounts to be recovered or an aggregate of all short-paid adjustment request amounts to be recovered. The meter reset process, on completion, may cause process 300 to perform at least one short-paid meter adjustment to generate evidence corresponding to the funds added to the VBI meter system 130 during the meter reset. Output files that evidence short-paid adjustments or indicate invalid short-paid adjustment requests are generated to complete the short-paid reconciliation process.

Systems 100 according to the disclosure of the present invention not only may be geographically distributed within a network or a series of networks, they may exist in a single location and may be dedicated to a single customer, client or consumer. Such systems 100 may consist of multiple parts that may be redundant and/or dedicated and may be geographically distributed in any of a number of ways.

In an embodiment, for example, system 100 may include multiple instances of components, such as of short-paid adjustment process and VBI meter system 130 components where all components are local to a client and remote from the data center. In another embodiment, system 100 may include multiple instances of components, such as of short-paid adjustment process and VBI meter system 130 components, where only some of those components are local to a client and remote from the data center. In another embodiment, system 100 may include a single instance of each component where they are all centralized at the data center. In yet another embodiment, system 100 may include multiple instances of each component where they are all centralized at the data center. And, in yet another embodiment, system 100 may include multiple instances of some components where they are all centralized at the data center.

Systems 100 according to the disclosure of the present invention may include components that are remote to the data center or even components within the VBI meter system 130. In remote system 100, sourcing may be completed at the data center and provide the data set at the data store 120 that represents all available sourced data adjustment requests from the initiator. In remote system 100, process 300 may be triggered by a remote connection in the form of a request such as, for example, a meter reset request. The data center may respond to the remote connection request with the requested information and, in addition, may provide all available data for processing short-paid adjustment requests. Remote system 100 may be configured to expect the additional short-paid adjustment request information in the response. Remote system 100 may be configured to request additional meter reset funds in order to satisfy any short-paid adjustment request before a short-paid adjustment process is triggered. Remote system 100 may also be configured to perform process 300 at any time after receipt of a short-paid adjustment request. Upon completion of process 300, remote system 100 may communicate back to the data center the status of the short-paid adjustment process. Output files including the status results of each remote system, and those of each local system, if any, may be generated and communicated to the initiator.

Systems 100 according to the disclosure of the present invention may include one or more dedicated centralized VBI meter systems 130 at a data center for dispensing evidence of short-paid adjustments for short-paid mail originating in other VBI meter systems belonging to customers of an authorized vendor. In an embodiment, for example, the one or more VBI meter systems 130 may be disposed in an open PES environment.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method for reconciling a request from a postal service provider for at least one short-paid adjustment to a value bearing item (VBI) meter system including one or more registers, the short-paid adjustment request for payment for delivery of a mailpiece to a recipient, the method comprising:

performing, by a computing system, operations comprising:

storing the at least one short-paid adjustment request from the postal service provider;

identifying at least one source for the short-paid adjustment request;

generating a request to the VBI meter system for evidence of a short-paid meter adjustment to the one or more registers of the VBI meter system based on at least one of the at least one source and a prior request for evidence of a short-paid meter adjustment, wherein the short-paid adjustment request causes the VBI meter system to perform an evaluation of available funds present on the VBI meter system and, where the evaluation indicates funds at least equal to an amount in the short-paid adjustment request are available, to update at least one of an ascending register value and a descending register value of the one or more registers of the VBI meter system based on the amount in the short-paid adjustment request;

receiving a VBI meter system response to the request from the VBI meter system;

storing the VBI meter system response to the request for evidence of the short-paid meter adjustment;

based upon a determination that the VBI meter system response includes evidence of a short-paid meter adjustment to the one or more registers of the VBI meter system, generating at least one file containing the evidence of the short-paid meter adjustment; and providing the file containing the evidence of the short-paid meter adjustment to the postal service provider;

wherein the mailpiece is delivered to the recipient regardless of the amount of available funds present on the VBI meter system when the evaluation is performed; and wherein, in response to the evaluation indicating an amount of available funds that is less than the amount in the short-paid adjustment request is present, the VBI meter system updates at least one of the ascending register value and the descending register value of the one or more registers of the VBI meter system based on the amount of available funds that is less than the amount in the short-paid adjustment request to provide a partial short-paid meter adjustment.

2. The method of claim 1, wherein, where the evaluation indicates the amount of available funds on the VBI meter system is at least equal to the amount in the short-paid adjustment request and further in response to the short-paid adjustment request, the VBI meter system:

generates a VBI;

stores, as the short-paid meter adjustment, a record including at least an updated register value; and outputs at least one of a result status and evidence of the short-paid meter adjustment.

3. The method of claim 2, wherein the evidence of the short-paid meter adjustment is the VBI.

4. The method of claim 1, wherein, where the VBI meter system evaluation indicates the available funds are less than the amount in the short-paid adjustment request, no register value update is performed and no VBI is generated in response to the short-paid adjustment request.

5. The method of claim 4, wherein the VBI meter system outputs a result status indicating at least one of no adjustment, a validation error and a system error.

6. The method of claim 1, further comprising generating no file for the postal service provider where the VBI meter system response contains no evidence of a short-paid meter adjustment.

7. The method of claim 1, further comprising validating the short-paid adjustment request prior to or in conjunction with the source identification.

8. The method of claim 1, wherein the at least one source is selected from the group consisting of a user account, a meter serial number, a meter account, and a funding account.

9. The method of claim 1, wherein, where the VBI meter system evaluation indicates the amount of available funds is less than the amount in the short-paid adjustment request at the time the evaluation is performed, the VBI meter system subsequently updates at least one of an ascending register value and a descending register value based on a value included in the short-paid adjustment request.

10. The method of claim 1, wherein the update to the at least one of the one or more registers of the VBI meter system based on the amount in the short-paid adjustment request occurs independently of delivery of the mailpiece to the recipient.

11. A non-transitory computer-readable medium storing a plurality of instructions which, when executed by a processor, perform a method for reconciling a request received from a postal service provider for at least one short-paid adjustment to a value bearing item (VBI) meter system including one or more registers, the short-paid adjustment request for payment for delivery of a mailpiece to a recipient, the method comprising:

storing the at least one short-paid adjustment request from the postal service provider;

identifying at least one source for the short-paid adjustment request;

generating a request to the VBI meter system for evidence of a short-paid meter adjustment to the one or more registers of the VBI meter system based on at least one of the at least one source and a prior request for evidence of a short-paid meter adjustment, wherein the short-paid adjustment request causes the VBI meter system to perform an evaluation of available funds present on the VBI meter system and, where the evaluation indicates an amount of available funds at least equal to an amount in the short-paid adjustment request are present, to update at least one of an ascending register value and a descending register value of the one or more registers of the VBI meter system based on the amount in the short-paid adjustment request;

receiving a VBI meter system response to the request from the VBI meter system;

storing the VBI meter system response to the request for evidence of the short-paid meter adjustment;

based upon a determination that the VBI meter system response includes evidence of a short-paid meter adjustment to the one or more registers of the VBI meter system, generating at least one file containing the evidence of the short-paid meter adjustment; and providing the file containing the evidence of the short-paid meter adjustment to the postal service provider;

wherein the mailpiece is delivered to the recipient regardless of the amount of available funds present on the VBI meter system when the evaluation is performed; and wherein, in response to the evaluation indicating an amount of available funds that is less than the amount in the short-paid adjustment request is present, the VBI meter system updates at least one of the ascending register value and the descending register value of the one or more registers of the VBI meter system based on the amount of available funds that is less than the amount in the short-paid adjustment request to provide a partial short-paid meter adjustment.

12. The non-transitory computer-readable medium of claim 11, wherein the method further includes generating no file for the postal service provider where the VBI meter system response contains no evidence of a short-paid meter adjustment.

13. The non-transitory computer-readable medium of claim 11, wherein the VBI meter system comprises processor-executable instructions stored therein configured to cause a processor to:
  generate a VBI;
  store, as the short-paid meter adjustment, a record including at least an updated register value; and
  output at least one of a result status and evidence of the short-paid meter adjustment.

14. The non-transitory computer-readable medium of claim 13, wherein evidence of the short-paid meter adjustment is a VBI.

15. The non-transitory computer-readable medium of claim 11, wherein, where the evaluation indicates the amount of available funds is less than the amount in the short-paid adjustment request, the VBI meter system outputs a result status indicating at least one of no adjustment, a validation error and a system error.

16. A system for reconciling a request from a postal service provider for at least one short-paid adjustment, the system comprising:
  a network;
  a value bearing item (VBI) meter system coupled to the network for generating evidence of a short-paid meter adjustment to the VBI meter system, the short-paid adjustment request for payment for delivery of a mailpiece to a recipient; and
  a processor coupled to the network, the processor configured to:
  identify at least one source for the short-paid adjustment request;
  generate a request to the VBI meter system for evidence of a short-paid meter adjustment to one or more registers of the VBI meter system based on at least one of the at least one source and a prior request for evidence of a short-paid meter adjustment, wherein the short-paid adjustment request causes the VBI meter system to perform an evaluation of available funds present on the VBI meter system and, where the evaluation indicates an amount of funds at least equal to an amount in the short-paid adjustment request are available, to update at least one of an ascending register value and a descending register value of the one or more registers of the VBI meter system based on the amount in the short-paid adjustment request;
  receive a VBI meter system response to the request from the VBI meter system;
  store the VBI meter system response to the request for evidence of the short-paid meter adjustment;
  based upon a determination that the VBI meter system response includes evidence of a short-paid meter adjustment to the one or more registers of the VBI meter system, generate at least one file containing the evidence of the short-paid meter adjustment for the postal service provider; and
  provide the at least one file containing the evidence of the short-paid meter adjustment to the postal service provider;
  wherein the mailpiece is delivered to the recipient regardless of the amount of available funds present on the VBI meter system when the evaluation is performed; and
  wherein, in response to the evaluation indicating an amount of available funds that is less than the amount in the short-paid adjustment request is present, the VBI meter system updates at least one of the ascending register value and the descending register value of the one or more registers of the VBI meter system based on the amount of available funds that is less than the amount in the short-paid adjustment request to provide a partial short-paid meter adjustment.

17. The system of claim 16, wherein the processor is configured to generate no file for the postal service provider where the VBI meter system response contains no evidence of a short-paid meter adjustment.

18. The system of claim 16, wherein the network is configured to facilitate at least one of:
  receiving a short-paid adjustment request from the postal service provider;
  communicating a request for evidence of a short-paid meter adjustment;
  transmitting a response to the request for evidence of a short-paid meter adjustment including at least one of a result status and evidence of a short-paid meter adjustment; and
  communicating, where the VBI meter system response results in evidence of a short-paid meter adjustment, at least one file for the postal service provider.

19. The system of claim 18, wherein the network is configured to communicate no file for the postal service provider where the VBI meter system response contains no evidence of a short-paid meter adjustment.

20. The system of claim 16, further comprising at least one additional processor for validating, sourcing, accounting and processing the short-paid adjustment request from the postal service provider.

21. The system of claim 16, further comprising at least one data store coupled to the network for storing data associated with the short-paid adjustment request, sourcing data, and data associated with VBI meter system responses.

22. The system of claim 21, wherein the at least one data store is remotely coupled to the network and is part of an independent system.

* * * * *